United States Patent
Hatano

(10) Patent No.: US 8,223,219 B2
(45) Date of Patent: Jul. 17, 2012

(54) IMAGING DEVICE, IMAGE PROCESSING METHOD, IMAGE PROCESSING PROGRAM AND SEMICONDUCTOR INTEGRATED CIRCUIT

(75) Inventor: Toshinobu Hatano, Kyoto (JP)

(73) Assignee: Panasonic Corporation, Osaka (JP)

( * ) Notice: Subject to any disclaimer, the term of this patent is extended or adjusted under 35 U.S.C. 154(b) by 120 days.

(21) Appl. No.: 12/947,613

(22) Filed: Nov. 16, 2010

(65) Prior Publication Data

US 2011/0058064 A1    Mar. 10, 2011

Related U.S. Application Data

(63) Continuation of application No. PCT/JP2009/001222, filed on Mar. 18, 2009.

(30) Foreign Application Priority Data

Aug. 4, 2008 (JP) ................................. 2008-201049

(51) Int. Cl.
*H04N 5/228* (2006.01)
*H04N 9/64* (2006.01)
*G06K 9/32* (2006.01)

(52) U.S. Cl. ...................... 348/222.1; 348/242; 382/298

(58) Field of Classification Search ............... 348/222.1, 348/241, 242; 382/166, 298–300
See application file for complete search history.

(56) References Cited

U.S. PATENT DOCUMENTS

| 4,855,812 A | 8/1989 | Rokuda et al. | |
|---|---|---|---|
| 6,147,707 A | 11/2000 | Terasawa et al. | |
| 8,026,952 B2 * | 9/2011 | Chen | 348/222.1 |
| 2002/0044778 A1 | 4/2002 | Suzuki | |
| 2003/0218682 A1 * | 11/2003 | Lim et al. | 348/333.11 |
| 2006/0132628 A1 | 6/2006 | Suzuki | |
| 2006/0256217 A1 * | 11/2006 | Hatano | 348/272 |
| 2007/0127095 A1 | 6/2007 | Sugimori | |

FOREIGN PATENT DOCUMENTS

| JP | 11-136693 | 5/1999 |
|---|---|---|
| JP | 2001-245141 | 9/2001 |
| JP | 2002-084547 | 3/2002 |
| JP | 2003-346143 | 12/2003 |
| JP | 2007-158509 | 6/2007 |

* cited by examiner

*Primary Examiner* — Daniel M Pasiewicz
(74) *Attorney, Agent, or Firm* — McDermott Will & Emery LLP

(57) ABSTRACT

A line-by-line filter process is performed to extract luminance data and color carrier data from an original image (i.e., a CCDRAW image) obtained from a single-sensor color imaging element, without separating the original image into R, G, and B data corresponding to a Bayer array. A color difference data demodulation process and a median noise removal process are performed with respect to the color carrier data to obtain color difference data. Band limitation filter processes having different characteristics are performed with respect to the luminance data and the color difference data, respectively. Moreover, separate resizing processes are performed with respect to the luminance data and the color difference data, respectively. A modulation process is performed to convert the resized color difference data to color carrier data. A color array reproduction process is performed to recombine the color carrier data and the resized luminance signal.

20 Claims, 13 Drawing Sheets

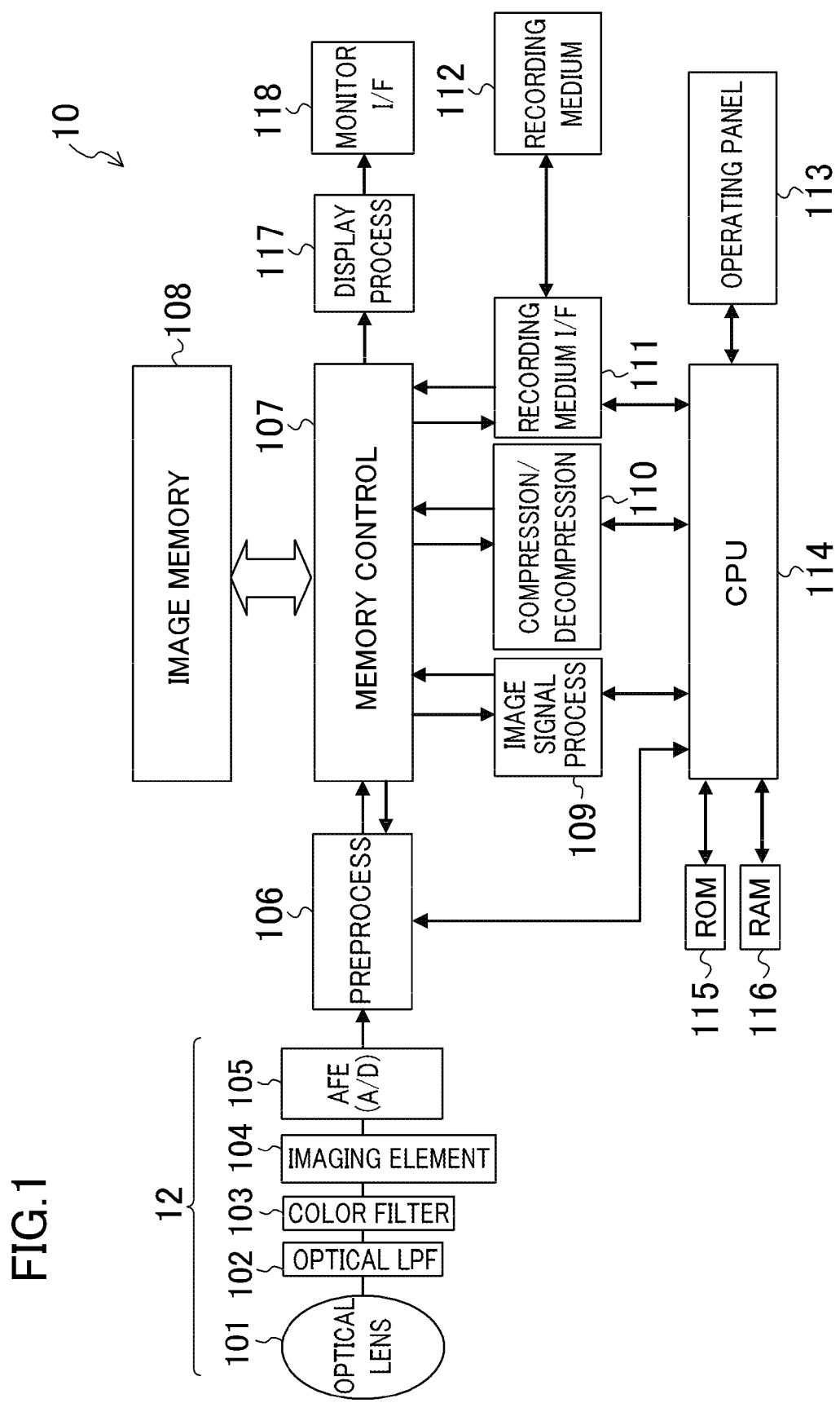

FIG.2A

| R | | B | | R | |
| --- | --- | --- | --- | --- | --- |
| | G | | G | | G |
| B | | R | | B | |
| | G | | G | | G |
| R | | B | | R | |
| | G | | G | | G |

FIG.2B

| R | G | R | G | R | G |
| --- | --- | --- | --- | --- | --- |
| G | B | G | B | G | B |
| R | G | R | G | R | G |
| G | B | G | B | G | B |
| R | G | R | G | R | G |
| G | B | G | B | G | B |

REPRODUCTION BAND OF R AND B

REPRODUCTION BAND OF G

IMAGING DEVICE, IMAGE PROCESSING METHOD, IMAGE PROCESSING PROGRAM AND SEMICONDUCTOR INTEGRATED CIRCUIT

CROSS-REFERENCE TO RELATED APPLICATIONS

This is a continuation of PCT International Application PCT/JP2009/001222 filed on Mar. 18, 2009, which claims priority to Japanese Patent Application No. 2008-201049 filed on Aug. 4, 2008. The disclosures of these applications including the specifications, the drawings, and the claims are hereby incorporated by reference in their entirety.

BACKGROUND

The present disclosure relates to imaging devices, image processing methods, image processing programs, and semiconductor integrated circuits having image processing functions. More particularly, the present disclosure relates to image data size changing devices, electronic still cameras, image data size changing programs, semiconductor integrated circuits, etc., suited to reduction, enlargement, and distortion correction of an original image obtained from a single-sensor color imaging element.

There are known digital cameras which employ an imaging element, such as a CCD, a MOS sensor, etc., to capture an image of a subject through a shooting lens, and perform a predetermined image process with respect to image data output from the imaging element. A typical digital camera converts an image signal obtained from the imaging element into 10-, 12-, or 14-bit digital data, performs various image processes with respect to the digital data, compresses the resultant image data using a compression technique, such as JPEG encoding, etc., and records the compressed data to a recording medium. The recorded image has been subjected to various image processes, and therefore, if the user performs an additional image process with respect to a reproduced image, the image quality may be degraded.

A technique of outputting digital data obtained by converting an analog signal of each pixel output from the imaging element, without performing image processing with respect to the digital data inside the camera (such data is referred to as "RAW data") is becoming popular as a function of single-lens reflex digital cameras. The RAW data is handled as follows. In the camera, the RAW data is recorded and maintained unprocessed. An external apparatus, such as a personal computer, etc., is used to reproduce (develop) an image from the RAW data. This enables the user to obtain a high-quality print of the image or to perform more sophisticated image editing which meets the user's requirements.

Imaging devices, such as those described above, include a color separation filter on an imaging element so as to capture a color image. For example, a color separation filter known as a Bayer filter includes primary color filters (i.e., red (R), green (G), and blue (B) color filters) arranged in a square grid, corresponding to pixels of the imaging element. Specifically, in the Bayer array, filters of the same color component are placed at every other pixel position along both the horizontal and vertical directions of the pixel array. Image data obtained through the color separation filter needs to be handled in a manner which maintains the Bayer pattern. If the Bayer pattern is disturbed, the color of a subject cannot be reproduced from the image data.

RAW-format data has a larger file size than that of JPEG-format data, etc., and therefore, it takes a longer time to reproduce RAW-format data. RAW data, which is original image data with a large size which has information about one color for each pixel, is reproduced by performing a synchronization process of obtaining information about R, G, or B for each pixel while performing gamma correction or achieving white balance, to obtain a final reproduced image. When the user wants to confirm the reproducibility of details of a subject, it is necessary to handle such a large-size image. On the other hand, for example, when the user wants to confirm only the reproducibility of colors (tone or feeling) or the result of changing of the level of brightness or gamma correction using, for example, the liquid crystal monitor of a digital camera, it is not necessary to use such a large image, and a small image is sufficient to confirm these things.

At present, the number of pixels in the imaging element is increasing and the high-speed read technique is advancing. Under these circumstances, when an image is captured in a record mode called small RAW in which the image is smaller than its original image or when a moving image having a standardized size, such as HD movie, is captured, a RAW image is reduced before a reproduction process or a recording process is performed, whereby a redundant process can be removed which would otherwise be performed in a subsequent process. Therefore, the processing time can be significantly reduced, and an approach to reduce the power consumption of the system can be taken.

As described above, a RAW image may be reduced so that the result of processing of RAW data is quickly displayed, the size of a preview image file is minimized, RAW-format data is recorded in the small RAW mode, a moving image having a standardized size is recorded, etc.

Conventionally, when RGB RAW data of an original image is resized, the RGB RAW data is separated into independent R, G, and B color data or pixel binning is performed by combining pixels of the same color, to perform decimation in the first process (see Japanese Patent Publication Nos. 2003-346143, 2001-245141, and 2002-84547). Alternatively, a full-size image is processed into YCrCb data, which is then put into a low-pass filter (LPF), and the resultant reduced-size data is recorded as a small RAW file (see Japanese Patent Publication No. 2007-158509).

SUMMARY

In the techniques described in Japanese Patent Publication Nos. 2003-346143, 2001-245141, and 2002-84547, when RGB RAW data of an original image is resized, the RGB RAW data is separated into independent R, G, and B color data or pixel binning is performed by combining pixels of the same color, to perform decimation in the first process. Therefore, when RGB data spatially arranged in RAW data is separated according to color, an alias in a low-frequency region of a high-frequency component close to the Nyquist frequency, which is generated by decimation caused by sampling or pixel binning, cannot be removed by an LPF, and therefore, a high-frequency false signal occurs in reduced RAW data which is rearranged after reduction. As a result, a false color may appear in an image or a degradation in the feel of resolution may occur, and therefore, disadvantageously, a reduced RAW image fails to maintain captured features in an original image to a sufficient level.

In the technique described in Japanese Patent Publication No. 2007-158509, a full-size image is processed before a reduction (resizing) process is performed. The reduction (resizing) process decreases the number of pixels to be recorded. The image process of data in the full-size image which is to be removed and eliminated by the reduction (resizing) process is redundant, resulting in poor efficiency in terms of power saving. Moreover, when the technique is implemented as hardware, such as an LSI, etc., data is processed via an external memory buffer, and therefore, the power consumption of an I/O buffer of the LSI increases in proportion to the amount of processing.

The detailed description describes implementations of an imaging device and an image processing method which can resize an original image while reducing a false luminance signal and a false color and keeping the feel of resolution, and an image processing program and a semiconductor integrated circuit which carry out the imaging device and the image processing method.

In the present disclosure, in order to generate a resized (reduced or enlarged) image from a digital image signal of an original image including pixels with a plurality of colors arranged in a color array with a periodicity, a two-line process is performed with respect to luminance data and color difference data obtained from the original image instead of separating the original data into R, G, and B data before performing a resizing process.

Specifically, in the present disclosure, performed are a filter process function of extracting luminance data and color carrier data from the original image by a line-by-line filter process, a noise removal function of removing noise from the color carrier data, a color difference data demodulation function of converting the noise-removed color carrier data into color difference data, a band limitation filter process function of performing band limitation filter processes having different characteristics with respect to the extracted luminance data and the color difference data, respectively, a resizing process function of reducing or enlarging the luminance data and the color difference data separately, a color carrier modulation function of converting the resized color difference data back into color carrier data, and a color array reproduction function of recombining the resized luminance data and the modulated color carrier data to generate a plurality of pieces of final color array data.

If the luminance data and the color difference data are resized on a line-by-line basis while continuously changing a resizing ratio, depending on a line position, an image having a resizing ratio varying from line to line can be generated from the digital image signal of the original image.

According to the present disclosure, for example, when an original image (RAW image) which has not been subjected to a signal process, such as synchronization, etc., is reduced (resized), the original image is subjected to an LPF having a band characteristic similar to a two-dimensional reproduction band having luminance signal components and color difference signal components of the original image without impairing a reproduction band having the luminance signal components and color signal components. A resizing process is performed with respect to the luminance signal components and the color difference signal components of the image processed by the LPF, thereby changing the number of pixels. The two signals are combined to obtain a resized image. The pixel resizing ratio is set, depending on the ratio of the original image and an image to be finally generated. The resultant resized image maintains a feature of a reproduction characteristic of the original image before resizing. As a result, the time required for the reproduction process can be reduced, and the maximum feel of resolution of each color signal can be maintained while the occurrence of a false signal in a final image is reduced or prevented.

More specifically, according to the present disclosure, RGB data spatially arranged in RAW data is not separated into the three colors (R, G, and B), and luminance data is resized using a luminance LPF corresponding to a size after resizing. Therefore, an alias of a high-frequency luminance component does not occur in a low-frequency region, and a high resolution can be ensured. Color data is subjected to a filter process having a different characteristic (enhanced performance of removing a high-frequency component) to extract a low-frequency component, which is then resized and combined with the luminance signal. As a result, the occurrence of a high-frequency false signal in the reduced RAW data is reduced or prevented, whereby the feel of resolution can be maintained while a false color is reduced.

In the process of resizing the continuous luminance data and color difference data, a variable resizing process may be used. As a result, a simple configuration can be used to maintain the feel of resolution and perform distortion correction while a false color is reduced.

By performing the reduction (resizing) process as a pre-process, an image having a smaller size than that of its original image can be displayed or recorded, whereby the amount of processing in a subsequent process can be reduced, resulting in higher efficiency in terms of power saving.

BRIEF DESCRIPTION OF THE DRAWINGS

FIG. 1 is a block diagram showing a configuration of an imaging device according to an embodiment of the present disclosure.

FIG. 2A is a conceptual diagram showing an example honeycomb-array color filter.

FIG. 2B is a conceptual diagram showing an example Bayer array.

DETAILED DESCRIPTION

Figure 3:
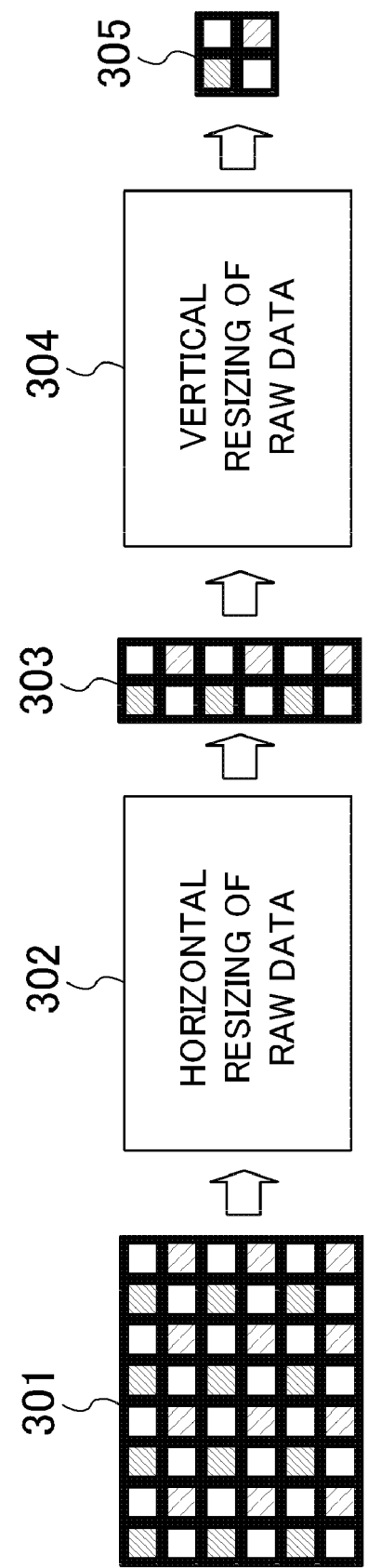
FIG. 3 is a diagram schematically showing an image processing method according to an embodiment of the present disclosure.

Preferred embodiments of an image processing method and an image processing program according to the present disclosure will be described with reference to the accompanying drawings.

FIG. 1 is a diagram showing a configuration of an imaging device according to an embodiment of the present disclosure. The imaging device 10 is a single-sensor digital camera which captures an optical image of a subject via an imager 12, converts the image into digital image data, and records the data to a recording medium 112. The imager 12 includes an optical lens 101, an optical LPF 102, a color filter 103, an imaging element 104, and an analog front end (AFE) unit 105.

The imaging element 104 is an image sensor, such as a CCD image sensor, a CMOS image sensor, etc. The imaging element 104 has a photodetector surface in which a large number of photodiodes (photosensitive pixels) are two-dimensionally arranged, and converts optical information about a subject passing through the optical lens 101 into an electrical signal. The optical LPF 102 removes high-frequency components which are higher than or equal to a sampling frequency which depends on the pixel pitch of the imaging element 104, etc., to reduce or prevent aliasing which occurs in the final image after image reproduction (signal processing).

The color filter 103 has a predetermined color array in which one of R, G, and B colors is located at a position corresponding to each pixel of the imaging element 104, and selects colors of light incident to the photodiodes which are photodetectors.

FIGS. 2A and 2B show example color filter arrays of the RGB primary color type. FIG. 2A shows a honeycomb array in which the center of the geometrical shape of one color filter is offset by ½ of a pitch from that of another photodetector along both of the row and column directions (the color filters occur at every other square position along both of the row and column direction of a square grid). FIG. 2B shows a Bayer array in which color filters are arranged in a square matrix, occurring at a predetermined pitch along both of the row and column directions (the color filters occur at every square position along both of the row and column direction of a square grid). Note that, in the actual imaging surface of the imaging element 104, the structure of the pixel array of FIG. 2A or 2B is periodically repeated along both of the horizontal and vertical directions. Of course, the implementation of the present disclosure is not limited to the example array structures of the color filter 103 of FIGS. 2A and 2B. A variety of array structures, such as a G-stripe, etc., may be employed. While the primary color filter is employed in this example, the implementation of the present disclosure is not limited to the primary color filter. Alternatively, a complementary color filter including yellow (Y), magenta (M), cyan (C), and green (G) color filters may be employed. Moreover, the primary color filters and the complementary color filters may be combined in any manner, or a white (W) color filter may be employed.

Light passing through the optical lens 101 of FIG. 1 passes through the optical LPF 102 and the color filter 103 to enter the imaging element 104. Each photodiode converts a subject image formed in the photodetector surface of the imaging element 104 into signal charge whose amount depends on the amount of incident light. Voltage signals (image signals) depending on the signal charge are successively read out based on pulses provided from a driver circuit (not shown).

The imaging element 104 has an electronic shutter function of controlling the charge accumulation time (shutter speed) of each photodiode using the timing of a shutter gate pulse. The operation (exposure, read, etc.) of the imaging element 104 is controlled by a CPU 114.

The image signal output from the imaging element 104 is transferred to the AFE unit 105. The AFE unit 105 performs processes, such as analog gain adjustment, correlated double sampling (CDS), etc., and then converts the resultant analog signal into a digital signal.

The imaging element 104, such as a CMOS sensor, etc., may include a noise processor and an A/D converter to directly output a digital signal. In this case. high-speed read operation can be achieved.

The digital image data obtained by the A/D conversion is or is not subjected to a signal process which is required, depending on the operating mode of the imaging device 10, before being recorded to the recording medium 112. The imaging device 10 of this example can record a JPEG-format image, and an image immediately after the A/D conversion (hereinafter referred to as a CCDRAW image).

In the case of JPEG-format recording, the digital image data obtained by the A/D conversion is transferred via a preprocessor 106 to an image signal processor 109. The preprocessor 106 and the image signal processor 109 perform various processes, such as a synchronization process (the color of each point is calculated by interpolation for a spatial gap between color signals in the color filter array), white balance (WB) adjustment, gamma correction, generation of a luminance signal and a color difference signal, contour enhancement, enlargement/reduction by an electronic zoom function, conversion of the number of pixels (resizing), etc., with respect to an image signal in accordance with a command from the CPU 114. The imaging device 10 includes an image memory 108 which can receive an image which occurs partway through a process via a memory controller 107 and temporarily store the image. The preprocessor 106 and the image signal processor 109 process an image signal using the image memory 108.

Image data which has been subjected to a predetermined signal process in the preprocessor 106 and the image signal processor 109 is transferred to a compressor/decompressor 110, which then compresses the image data in accordance with the JPEG compression format. Note that the compression format is not limited to JPEG, and any other formats, such as MPEG, etc., may be employed. A compression engine corresponding to the compression format is used.

The compressed image data is recorded via a recording medium interface (I/F) unit 111 to the recording medium 112. The recording medium 112 is not limited to semiconductor memories, such as a memory card, etc. Various other media, such as a magnetic disk, an optical disc, an optomagnetic disk, etc., can be employed. The recording medium 112 is also not limited to removable media, and may be incorporated in the imaging device 10 (e.g., an internal memory).

On the other hand, in the case of a mode in which a CCDRAW image is recorded, digital image data obtained by A/D conversion in the AFE unit 105 is recorded via the memory controller 107 and the recording medium I/F unit 111 to the recording medium 112 without being subjected to synchronization and the other signal processes. Specifically, the CCDRAW image is an image which has not been subjected to signal processes, such as gamma correction, white balance adjustment, synchronization, etc., and a mosaic image in which a piece of color information is stored for each pixel and the color varies from pixel to pixel in accordance with the array pattern of the color filter 103. Of course, a compression process has not been performed, and therefore, the CCDRAW image has a large file size. Note that when the CCDRAW image is recorded to the recording medium 112, the CCDRAW image may be reversibly compressed and recorded or may be recorded without compression.

The CPU 114 is a control unit which performs a centralized control with respect to the imaging device 10 in accordance with a predetermined program. The CPU 114 controls operation of each circuit in the imaging device 10 in accordance with a command signal from an operating panel 113. A ROM 115 stores a program executed by the CPU 114, various data required for control, etc. A RAM 116 is used as a working area for the CPU 114.

The operating panel 113 is used by the user to input various commands to the imaging device 10. For example, the operating panel 113 includes various operating means, such as a mode select switch for selecting the operating modes of the imaging device 10, a cross key for inputting a command to select a menu item (move a cursor), a command to move a reproduced image forward or backward by a frame-by-frame basis, etc., an execution key for inputting a command to confirm (register) a selected item or a command to execute an operation, a cancel key for erasing a desired target, such as a selected item, etc., or cancelling a command, a power switch, a zoom switch, a shutter-release switch, etc.

The CPU 114 controls the imager 12 including the imaging element 104, etc. based on various shooting settings (exposure settings, the presence or absence of strobe flash, a shooting mode, etc.) in accordance with a command signal input from the operating panel 113. The CPU 114 also performs automatic exposure (AE) control, automatic focus adjustment (AF) control, automatic white balance (AWB) control, lens drive control, image processing control, control of reading or writing of the recording medium 112, etc.

For example, the CPU 114, when detecting that the shutter-release switch is pressed halfway down, performs the automatic focus adjustment (AF) control, and when detecting that the shutter-release switch is pressed all the way down, starts the exposure control and the read control to capture an image to be recorded. The CPU 114 also optionally transmits a command to a strobe control circuit (not shown) to control light emission of a flashtube (light emission unit), such as a xenon flashtube, etc.

The preprocessor 106 includes an automatic calculator which performs calculation required for the AE control and the AF control. The preprocessor 106 performs focus evaluated value calculation, AE calculation, etc. based on an image signal which is captured in response to the halfway-pressed shutter-release switch, and transfers the result of the calculation to the CPU 114. When detecting that the shutter-release switch is pressed all the way down, the CPU 114 controls a lens drive motor (not shown) based on the result of the focus evaluated value calculation to move the optical lens 101 to a focus position, and also controls the diaphragm and the electrical shutter to adjust exposure. Image data thus captured is recorded to the recording medium 112. Note that a reference character 117 indicates a display processor, and a reference character 118 indicates a monitor I/F unit.

Next, an image processing device and an image processing method which handle a CCDRAW image recorded by the imaging device 10 thus configured will be described. The CCDRAW image recorded by the imaging device 10 is subjected to a reproduction (development) process by a dedicated image processing device, a personal computer, etc. Alternatively, the reproduction (development) process can be performed by the preprocessor 106 and the image signal processor 109 of FIG. 1.

FIG. 3 is a diagram schematically showing the procedure of an image process which generates a reduced image from a CCDRAW image. A case where this image process is performed by the preprocessor 106 and the image signal processor 109 of FIG. 1 will be described hereinafter.

As shown in FIG. 3, a reduction (resizing) process is performed with respect to a CCDRAW image 301 which is an original image (one surface) captured by a single-sensor imaging element. The reduction (resizing) process is a two-step process including a RAW data horizontal resizing process 302 and a RAW data vertical resizing process 304. The horizontal resizing process 302 changes the CCDRAW image 301 to a CCDRAW resized image 303 which is resized in the horizontal direction. The vertical resizing process 304 further changes the CCDRAW resized image 303 to a CCDRAW resized image 305 which is resized in the vertical direction.

The two-step resizing process (302 and 304) is performed by two methods. The methods will be schematically described with reference to FIGS. 4 and 5, respectively.

Figure 4:
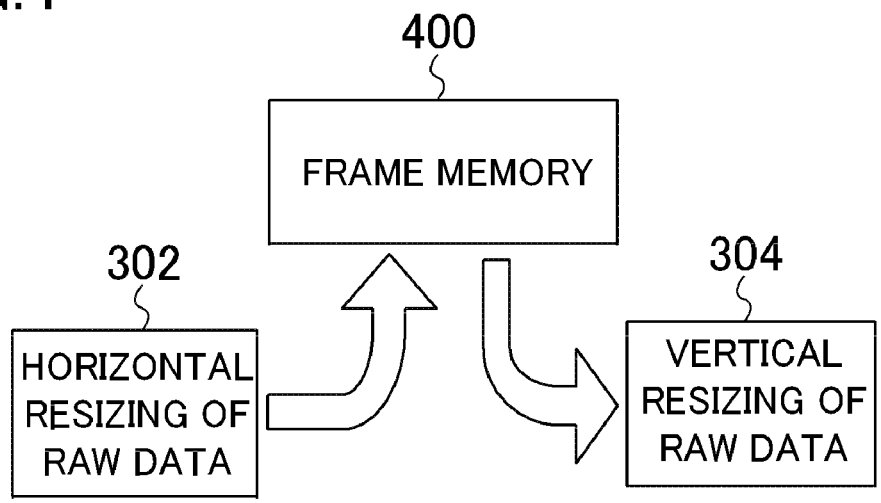
FIG. 4 is a conceptual diagram showing an example in which a frame memory is used in a two-step resizing process of FIG. 3.

In FIG. 4, a frame memory 400 is used as a buffer for the two-step resizing process (302 and 304). After the horizontal resizing process 302, all the CCDRAW resized image 303 is temporarily written to the frame memory 400. Thereafter, the CCDRAW resized image 303 is read out in the vertical direction and subjected to the vertical resizing process 304 to obtain the final CCDRAW resized image 305. In this case, the vertical resizing process 304 is identical to the horizontal resizing process 302.

Figure 5:
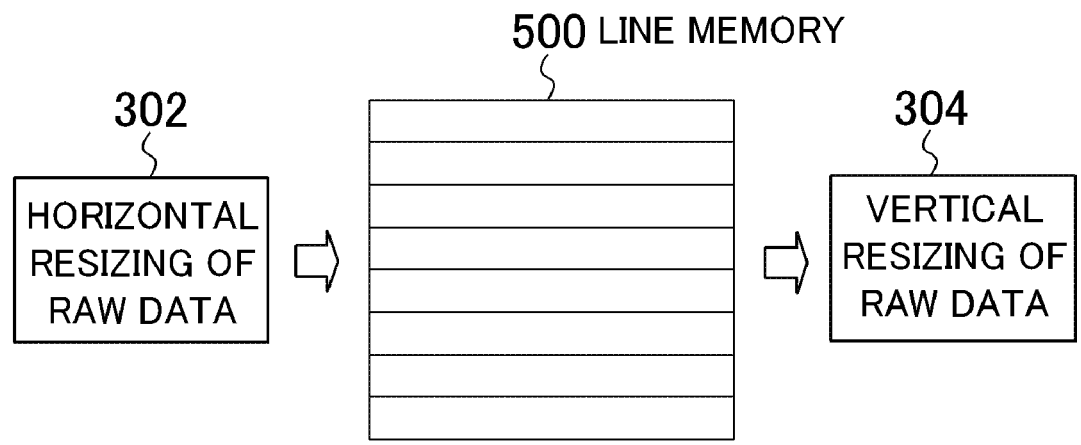
FIG. 5 is a conceptual diagram showing an example in which a line memory including a plurality of lines is used in the two-step resizing process of FIG. 3.

In FIG. 5, a line memory 500 including a plurality of lines is used as a buffer for the two-step resizing process (302 and 304). While the horizontal resizing process 302 is being performed, the output of the horizontal resizing process 302 is written to the line memory 500. At the same time, CCDRAW resized data corresponding to a plurality of successive lines of the CCDRAW resized image 303 is read from the line memory 500, the vertical resizing process 304 is performed in the vertical direction with respect to data at the same position in the horizontal direction on the plurality of lines, to obtain the final CCDRAW resized image 305. In this case, the vertical resizing process 304, which is different from the horizontal resizing process 302, is performed based on a process of determining whether or not an output of an operation which is performed for a plurality of lines at a time is to be used on a line-by-line basis.

The horizontal resizing process 302 will be described in detail with reference to FIG. 6. The horizontal resizing process 302 is a one-dimensional pipeline process. The horizontal resizing process 302 includes a color carrier removal filter process 602 which extracts luminance data from a CCDRAW image 601 by a filter process performed on a line-by-line basis, a color carrier extraction filter process 606 which extracts color carrier data, a color difference data demodulation process 607 which performs color inversion demodulation with respect to modulated color carrier data to output continuous color difference data, a median noise removal process 608 which performs noise removal with respect to the continuous color difference data, a luminance band limitation filter process 603 and a color difference band limitation filter process 609 which perform filter processes having different characteristics with respect to the extracted luminance data and the color difference data, respectively, a luminance signal horizontal reduction (resizing) process 604 and a color difference signal horizontal reduction (resizing) process 610 which perform reduction (resizing) with respect to the luminance data and the color difference data, respectively and separately, a color carrier modulation process 611 which converts the resized color difference data back into color carrier data, and performs gain level adjustment with respect to the color carrier data, a gain level adjustment process 605 which performs gain level adjustment with respect to the resized luminance data, and a color array reproduction process 612 which recombines the level-adjusted resized luminance data and the modulated color carrier data to generate a plurality of pieces of final color array data.

A case where an image having the Bayer pattern is processed using the horizontal resizing process function described in detail with reference to FIG. 6, will be described. This process is used, for example, when a preview of the result of the CCDRAW process is displayed, a captured RAW image is reduced, or a captured moving image is recorded in a standard size smaller than the number of pixels of the imaging element 104.

Figure 6:
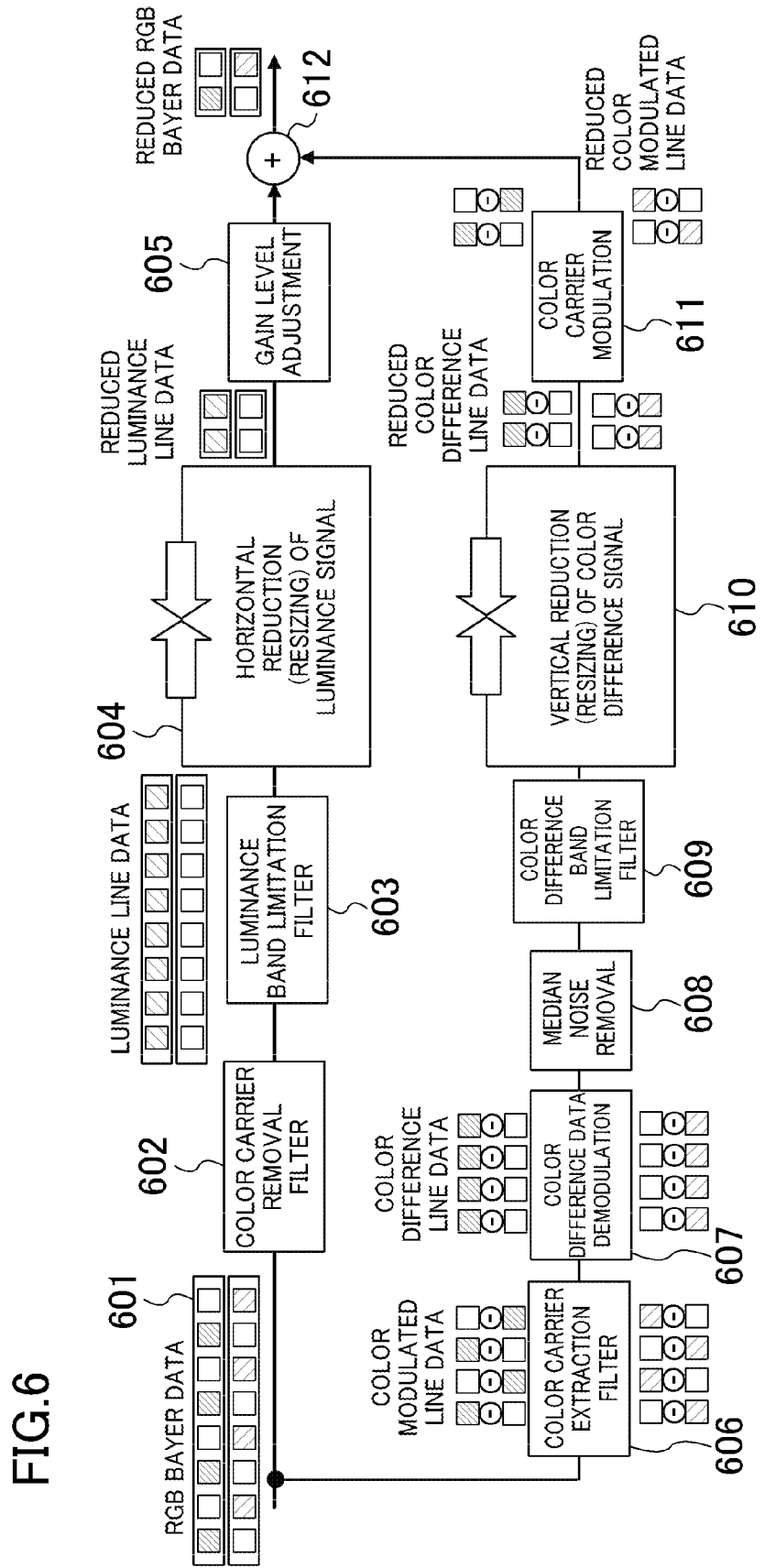
FIG. 6 is a diagram showing a detailed procedure of a RAW data horizontal resizing process of FIG. 3.

As shown in FIG. 6, the CCDRAW image 601 which is an original image is a mosaic image in which the pixel positions of the Bayer array are maintained, and is typically read out from the imaging element 104 on a line-by-line basis. The lines of input data of the original image include RG lines in which R information alternates with G information on a pixel-by-pixel basis, and BG lines in which B information alternates with G information on a pixel-by-pixel basis. The two types of line data are subjected to the color carrier removal filter process 602 which removes a color carrier close to a Nyquist frequency varying at intervals of two pixels, so that luminance data $\{\alpha(R+G)\}$ which is an average value of R and G is output for the RG lines, and luminance data $\{\alpha(B+G)\}$ which is an average value of B and G is output for the BG lines.

The two types of line data are also subjected to the color carrier extraction filter process 606 which extracts a color carrier close to the Nyquist frequency varying at intervals of two pixels, so that R–G component data modulated with the Nyquist frequency is output for the RG lines, and B–G component data modulated with the Nyquist frequency is output for the BG lines. The R–G component data and the B–G component data modulated with the Nyquist frequency are subjected to the color difference data demodulation process 607 which performs sign reversal on a pixel-by-pixel basis, to be output as continuous R–G data and B–G data. The continuous R–G data and B–G data are further subjected to the median noise removal process 608 so that a random noise component contained in the output of the imaging element is removed.

When the two types of extracted data, i.e., the luminance data and the color difference data, are subjected to horizontal reduction (resizing) with the same ratio, the luminance band limitation filter process 603 and the color difference band limitation filter process 609 having different characteristics are performed with respect to the luminance data and the color difference data, respectively, so as to reduce aliasing noise occurring after the reduction. In this case, assuming that the final recording format is JPEG, TIFF, or MPEG, the color difference band limitation is preferably set to be smaller than or equal to ½ of the luminance band limitation. The band-limited luminance data is subjected to linear interpolation/decimation in accordance with a reduction ratio by the luminance signal horizontal reduction (resizing) process 604. On the other hand, the band-limited color difference data is subjected to linear interpolation/decimation in accordance with a reduction ratio by the color difference signal horizontal reduction (resizing) process 610.

The horizontally-resized color difference data $\{\beta(R–G), \beta(B–G)\}$ is subjected to the color carrier modulation process 611 which performs sign reversal on a pixel-by-pixel basis, and is an equivalent process to modulation with the Nyquist frequency varying at intervals of two pixels. As a result, $\{\beta(R–G), -\beta(R–G)\}$ and $\{\beta(B–G), -\beta(B–G)\}$ are obtained.

On the other hand, the resized luminance data is subjected to the gain level adjustment process 605 before being subjected to recombination by the color array reproduction process 612 which adds the resized luminance data and color carrier data. As a result, resized RG lines in which R information alternates with G information on a pixel-by-pixel basis, and resized BG lines in which B information alternates with G information on a pixel-by-pixel basis, are output.

The recombination of the RG lines is indicated by the following mathematical expression. Initially, when it is assumed that $\alpha=0.5$ and $\beta=0.5$, the luminance data $\{\alpha(R+G)\}$ and the color carrier data $\{\beta(R–G), -\beta(R–G)\}$ are luminance data $\{0.5(R+G)\}$ and color carrier data $\{0.5(R–G), -0.5(R–G)\}$. As luminance data is added every pixel, $0.5\{(R+G)+(R–G)\}$, $0.5\{(R+G)-(R–G)\}$, and so on are repeatedly calculated. Thus, RG line data is reproduced as R, G, R, G, and so on.

Similarly, the recombination of the BG lines is indicated by the following mathematical expression. Initially, when it is assumed that $\alpha=0.5$ and $\beta=0.5$, the luminance data $\{\alpha(B+G)\}$ and the color carrier data $\{\beta(B–G), -\beta(B–G)\}$ are luminance data $\{0.5(B+G)\}$ and color carrier data $\{0.5(B–G), -0.5(B–G)\}$. As luminance data is added every pixel, $0.5\{(B+G)+(B–G)\}$, $0.5\{(B+G)-(B–G)\}$, and so on are repeatedly calculated. Thus, BG line data is reproduced as B, G, B, G, and so on.

The coefficients $\alpha$ and $\beta$ of luminance data and color difference data are set to adjust the gains of the data before the addition process so that the gain of the combined data is substantially equal to the gain of the input. The purpose of this adjustment is to generate a single separate color component R, G, or B from two signal components, i.e., a luminance signal and a color difference signal. Therefore, the gain adjustment does not necessarily need to be performed before the calculation, and may be performed after separate RGB color components are obtained.

Although the median noise removal process 608 is performed with respect to continuous R–G data and B–G data in the foregoing description, the median noise removal process 608 may be performed with respect to pixels of the same color occurring at every other pixel position before the color carrier extraction filter process 606 is performed.

The flow of the enlargement process using the horizontal resizing process function of FIG. 6 is similar to that described above. Note that, in the enlargement process, the number of pieces of output data is larger than the number of pieces of input data, and therefore, a process subsequent to the resizing processes 604 and 610 is performed at higher speed, or continuous input data is temporarily stopped, and a process preceding the resizing processes 604 and 610 is also synchronously stopped.

Although the RGB Bayer array has been used to describe the horizontal resizing process function, a honeycomb array can be used to carry out the present disclosure. Specifically, in the case of the honeycomb array of FIG. 2A, when data is extracted on a line-by-line basis, R and B are periodically repeated in the odd-numbered lines, and a continuous G signal is obtained in the even-numbered lines. In the even-numbered lines, although there is not a color modulated component, the G signal can be processed by the method of the present disclosure, assuming that the G signal is luminance data. Also, for the even-numbered lines containing only the G signal in which there is not a modulated component, the gain of the output is set to zero in the color carrier modulation process 611, and by recombination performed by the color array reproduction process 612, resized RB lines in which R information alternates with B information on a pixel-by-pixel basis, and resized G lines in which G information is continuously arranged, are output.

The horizontal resizing process function of FIG. 6 can be used when the two-step resizing process (302 and 304) of FIG. 4 is performed. In this case, the vertical resizing process 304 is identical to the horizontal resizing process 302.

Next, a case where the line memory 500 including a plurality of lines is used as a buffer for the two-step resizing process (302 and 304) as shown in FIG. 5 will be described in detail.

Figure 7:
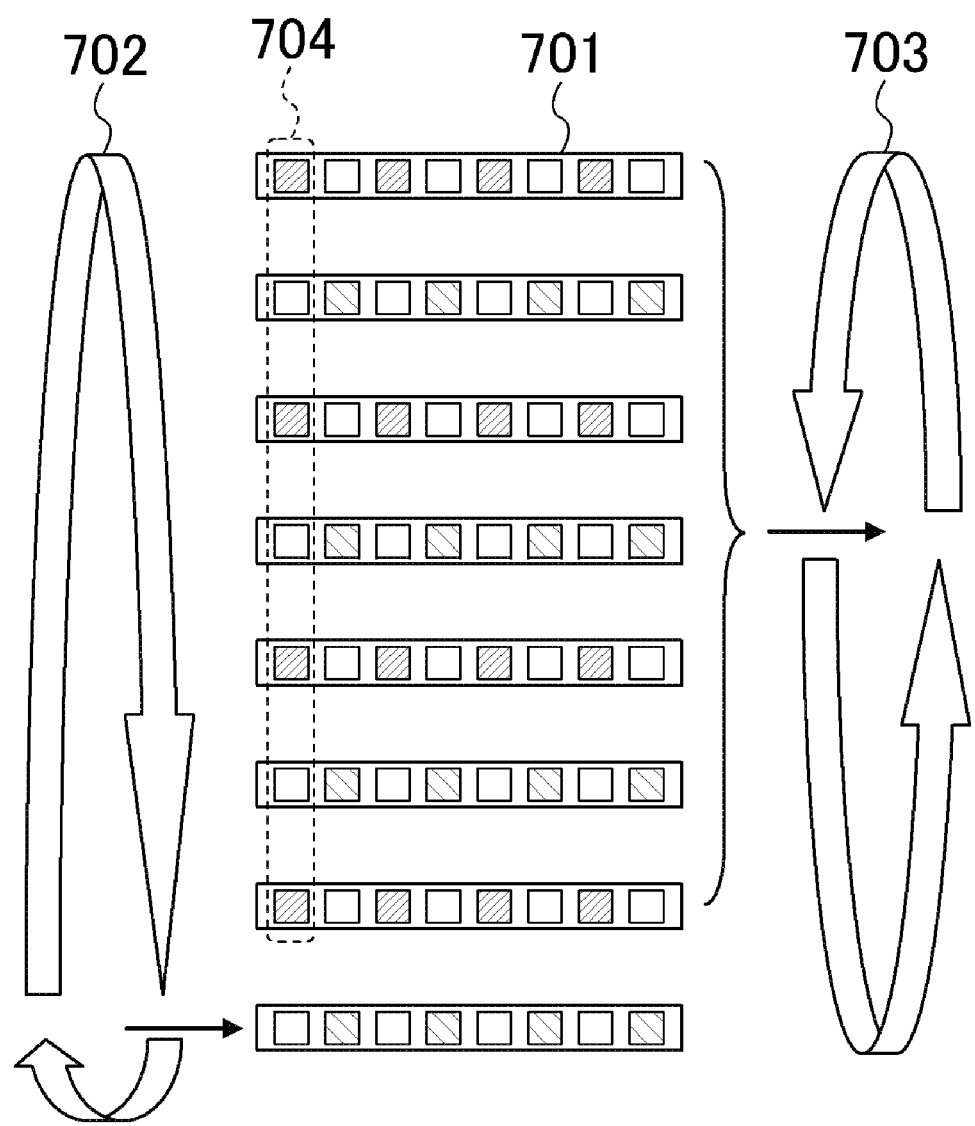
FIG. 7 is a conceptual diagram showing write operation and read operation of the line memory when the example of FIG. 5 is carried out.
Figure 8:
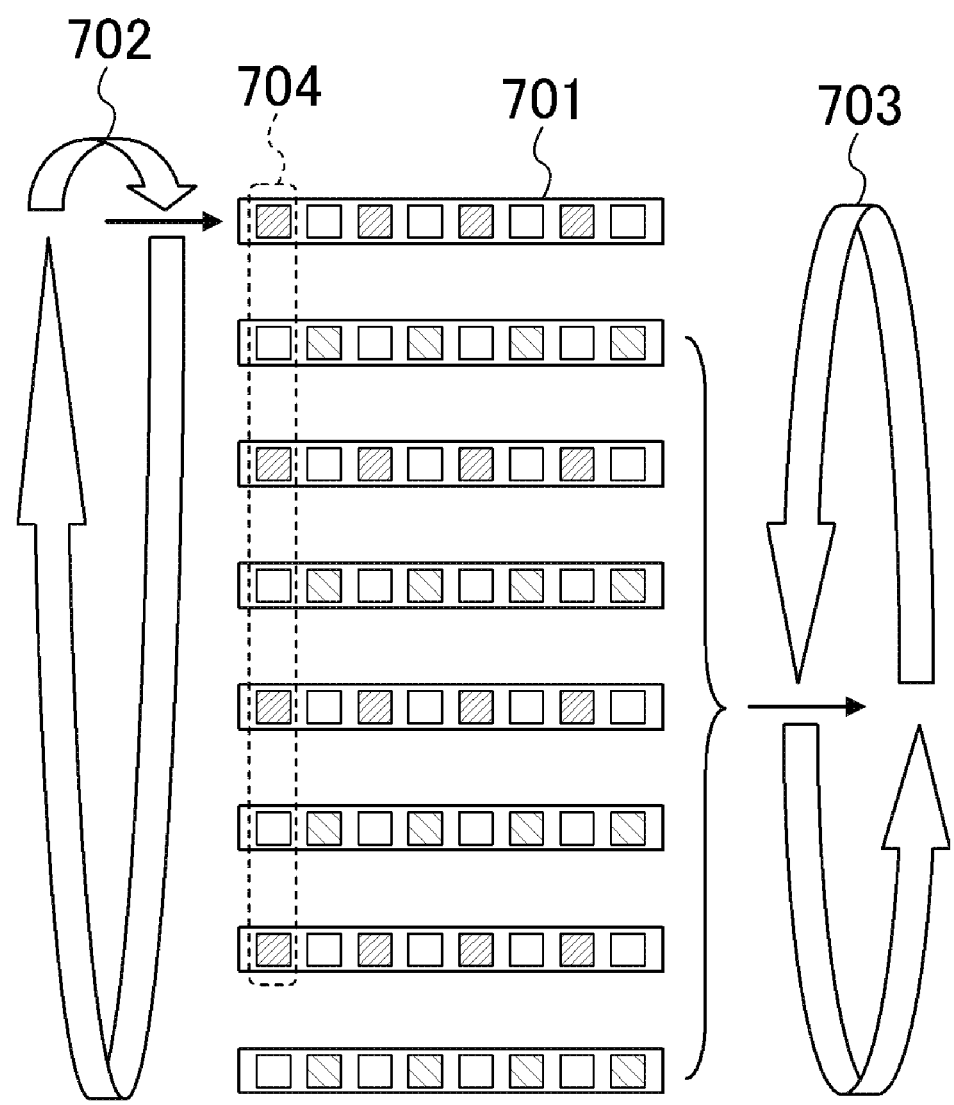
FIG. 8 is a conceptual diagram showing write operation and read operation of the line memory at the next timing following FIG. 7.

FIG. 7 shows write operation and read operation of a line memory in this case. FIG. 8 shows write operation and read operation of the line memory at the next timing following FIG. 7. In FIGS. 7 and 8, a reference character 701 indicates the line memory including eight lines. A reference character 702 indicates a data write cycle for the line memory 701. A write control with respect to the eight lines is performed so that the lines are successively subjected to write operation on a line-by-line basis and in a ring cyclic manner. A reference character 703 indicates a data read cycle for the line memory 701. The lines are successively subjected to read operation in a ring cyclic manner as in the write control, but memory data on seven of the eight lines is selected together in each read operation step.

In the example of FIGS. 7 and 8, in order to minimize the capacity of the line memory 701, the position of the leading line of the 7-line simultaneous cyclic read operation is delayed by one line from the position of a write line. By separating the write line from the read lines, write operation and read operation can be asynchronously performed.

A plurality of successive lines of CCDRAW resized data from the CCDRAW resized image 303 are read together from the line memory 701 of FIGS. 7 and 8. The vertical resizing process 304 is performed with respect to data 704 located at the same position in the horizontal direction on the plurality of lines, to obtain the CCDRAW resized image 305. In this case, the vertical resizing process 304 is different from the horizontal resizing process 302. The vertical resizing process 304 is performed after the number of output lines with respect to the number of input lines is changed, depending on the result of a determination process of determining whether or not any process output obtained from a plurality of lines at a time is utilized on a line-by-line basis.

Figure 9:
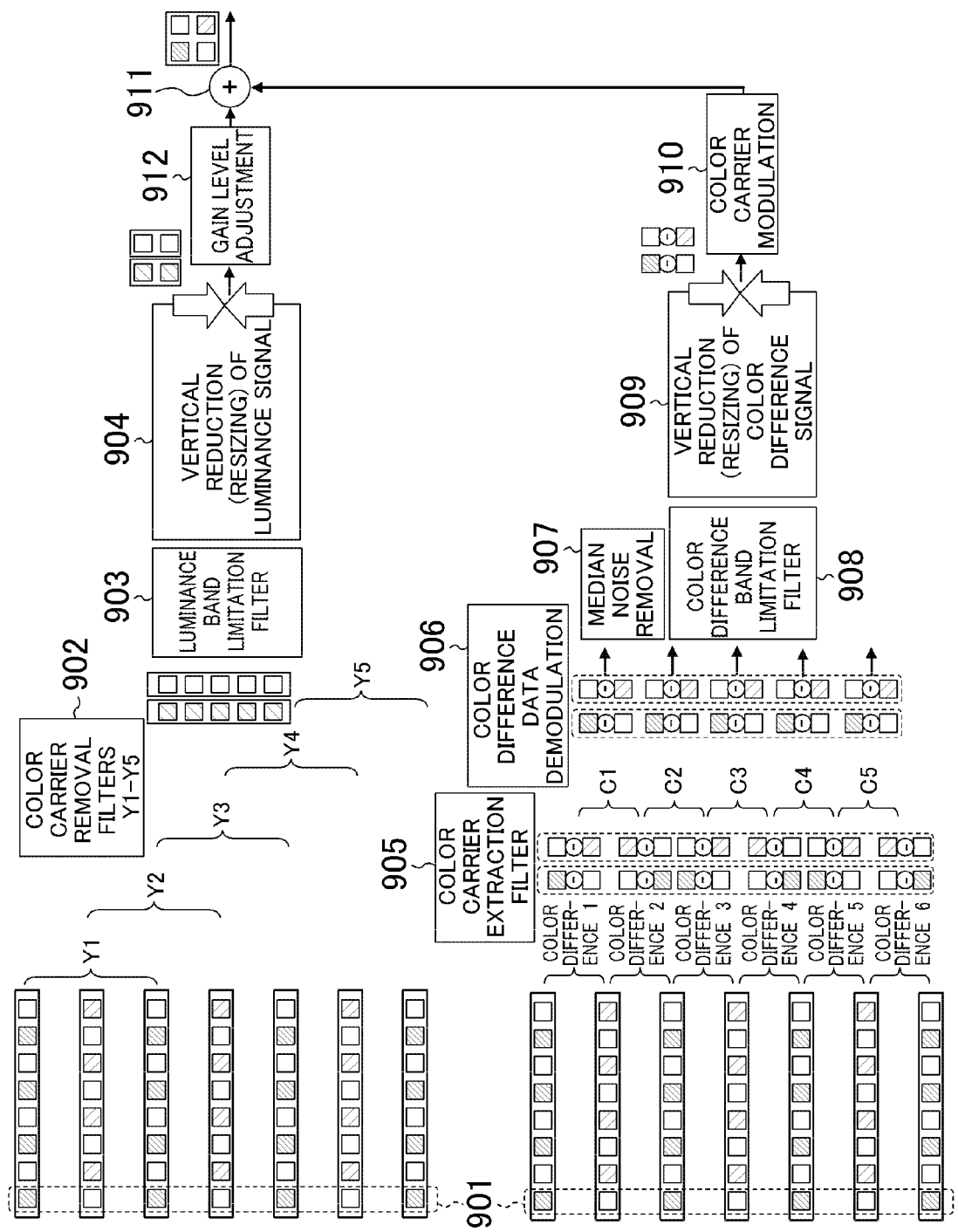
FIG. 9 is a diagram showing a detailed procedure of a RAW data vertical resizing process of FIG. 3 when a line memory is used.

FIG. 9 shows a detailed procedure of the vertical resizing process 304 of FIG. 3 when the line memory 701 of FIGS. 7 and 8 is used. In the vertical resizing process 304, a basic process performed in the vertical direction is a pipeline process for one line, and the number of output lines is controlled by a determination process of determining how many input lines are to be used as valid lines in a succeeding stage.

The vertical resizing process 304 of FIG. 9 is a two-line process including a luminance signal process and a color difference signal process as in the horizontal resizing process 302 of FIG. 6. Note that, in FIG. 9, seven pixels located at the same horizontal position in the vertical direction are handled as a processing unit 901 with respect to seven lines of CCDRAW image as input data.

The vertical resizing process 304 of FIG. 9 includes a color carrier removal filter process 902 which extracts luminance data in the vertical direction from the seven lines of CCDRAW image, a color carrier extraction filter process 905 which extracts color carrier data in the vertical direction, a color difference data demodulation process 906 which performs color inversion demodulation with respect to the vertically modulated color carrier data to output color difference data which is continuous in the vertical direction, a median noise removal process 907 which performs noise removal with respect to the color difference data which is continuous in the vertical direction, a luminance band limitation filter process 903 and a color difference band limitation filter process 908 which perform filter processes having different characteristics in the vertical direction with respect to the extracted luminance data and the color difference data, respectively, a luminance signal vertical reduction (resizing) process 904 and a color difference signal vertical reduction (resizing) process 909 which perform reduction (resizing) with respect to the luminance data and the color difference data, respectively and separately, a color carrier modulation process 910 which converts the resized color difference data back into color carrier data, and performs gain level adjustment with respect to the color carrier data, a gain level adjustment process 912 which performs gain level adjustment with respect to the resized luminance data, and a color array reproduction process 911 which recombines the level-adjusted resized luminance data and the modulated color carrier data to generate a plurality of pieces of final color array data.

A case where the reduction (resizing) process is performed with respect to a Bayer pattern image using the vertical resizing process function whose details are shown in FIG. 9, will be described. This process is used, for example, when a preview of the result of the CCDRAW process is displayed, a captured RAW image is reduced, or a captured moving image is recorded in a standard size smaller than the number of pixels of the imaging element 104.

As shown in FIG. 9 (process unit 901), a CCDRAW image after the horizontal resizing process holds a mosaic pattern in which the pixel positions of the Bayer array are maintained, and is written to the line memory 701 on a line-by-line basis and in a cyclic manner as shown in FIGS. 7 and 8, or is read out from a plurality of lines at a time and in a cyclic manner. In this example, the line memory 701 including eight lines is used, and the outputs of seven lines are output together.

The seven-line input data after the horizontal resizing process, i.e., the process unit 901 of FIG. 9, is vertical line data of interest located at the same position in the horizontal direction on seven lines, which is one of two types of lines: an RG line in which R information alternates with G information on a pixel-by-pixel basis in the vertical direction; and a BG line in which B information alternates with G information on a pixel-by-pixel basis in the vertical direction.

The two types of vertical line data contain color carrier information close to the Nyquist frequency varying at intervals of two pixels in the vertical direction. The two types of vertical line data are processed by Y1-Y5 of the color carrier removal filter process 902 which removes the color carrier, to generate luminance data. In this embodiment, filters of Y1-Y5 process data of three pixels for each filter to output five pieces of luminance data. For vertical RG lines, luminance data which is an average value of R and G is output, and for vertical BG lines, luminance data which is an average value of B and G is output.

The two types of vertical line data are processed by color differences 1-6 of the color carrier extraction filter process 905 which extracts a color carrier close to the Nyquist frequency varying at intervals of two pixels in the vertical direction. As a result, for RG lines, R–G component data modulated with the Nyquist frequency is output, and for BG lines, B–G component data modulated with the Nyquist frequency is output.

The six pieces of R–G component data and the six pieces of B–G component data modulated with the Nyquist frequency in the vertical direction are subjected to the color difference data demodulation process 906 which performs sign reversal on a pixel-by-pixel basis in the vertical direction, so that R–G data and B–G data which are continuous in the vertical direction are output. Here, average values of pairs of two lines are output as C1-C5 so that the center of mass in the vertical direction coincides with that of the luminance data, and the number of lines is equal to that of Y1-Y5.

The five pieces of R–G data and the five pieces of B–G data which are continuous in the vertical direction are further subjected to the median noise removal process 907 so that a random noise component contained in the output of the imaging element is removed.

When the two types of data, i.e., luminance data and color difference data, which have been extracted in the vertical direction, are subjected to vertical reduction (resizing) with the same ratio, the luminance band limitation filter process 903 and the color difference band limitation filter process 908 having different characteristics are performed with respect to the luminance data and the color difference data, respectively, so as to reduce aliasing noise occurring after the reduction. In this case, assuming that the final recording format is JPEG, TIFF, or MPEG, the color difference band limitation is preferably set to be smaller than or equal to ½ of the luminance band limitation. The vertically band-limited luminance data is subjected to linear interpolation in the vertical direction of the seven-line input of the CCDRAW resized image 303 in accordance with the reduction ratio, and line decimation on a line-by-line basis in accordance with the reduction ratio, in the luminance signal horizontal reduction (resizing) process 904. On the other hand, the vertically band-limited color difference data is subjected to linear interpolation in the vertical direction of the seven-line input of the CCDRAW resized image 303 in accordance with the reduction ratio as in the case of the luminance data, and line decimation on a line-by-line basis in accordance with the reduction ratio, in the color difference signal horizontal reduction (resizing) process 909.

The color difference data resized by the vertical line decimation is subjected to the color carrier modulation process 910 which reverses a sign for each line output, and is an equivalent process to modulation with the Nyquist frequency varying at intervals of two pixels in the vertical direction. On the other hand, the luminance data resized by the vertical line decimation is subjected to the gain level adjustment process 912, and then recombination by the color array reproduction process 911 in which the resultant luminance data and the color carrier data resized by the vertical line decimation are added together. As a result, RG lines which are resized in both of the vertical and horizontal directions and in which R information alternates with G information on a pixel-by-pixel basis in the vertical direction, and BG lines which are resized in both of the vertical and horizontal directions and in which B information alternates with G information on a pixel-by-pixel basis in the vertical direction, are output.

Although an example in which the median noise removal process 907 is performed with respect to continuous R–G data and B–G data has been described, the median noise removal process 907 may be performed with respect to pixels with the same color occurring at every other pixel position before the color carrier extraction filter process 905 is performed.

Although reduction (resizing) has been described in this embodiment, even when the enlargement process is performed using the vertical resizing process function of FIG. 9, the process flow is similar to that described above. Note that, in the enlargement process, the number of lines of output data is larger than the number of lines of input data, and therefore, processes subsequent to the resizing processes 904 and 909 are performed at higher speed, or continuous input data is temporarily stopped, and processes preceding the resizing processes 904 and 909 are also synchronously stopped.

The CCDRAW resized image 305 thus obtained is input to the image signal processor 109 of FIG. 1 and subject to a signal process so that the CCDRAW resized image 305 is converted into a final image, such as a preview display image, or a moving image to be recorded in a standard size smaller than the number of pixels of the imaging element 104.

Next, the band limitation filter processes 603 and 609 or 903 and 908 of FIGS. 6 and 9 will be described in detail. As described above, when the CCDRAW image 301 is reduced (resized) before being subjected to a predetermined process, it is important to design a band limitation filter in accordance with the reduction ratio. The band characteristic of the band limitation filter may be the reduction ratio×fs (where fs is a sampling frequency) for luminance data. For color difference data, the band characteristic of the band limitation filter is preferably ½ of that for luminance data, i.e., the reduction ratio×fs/2. In contrast to this, if the same filter process is performed with respect to both luminance data and color difference data, a degradation occurs in luminance data, which inherently has a high sampling frequency, in terms of feel of resolution, and a degradation occurs in color difference data, which inherently has a low sampling frequency, in terms of false signal.

Therefore, in the embodiment of the present disclosure, the CCDRAW image 301 is subjected to the band limitation filter processes 603 and 609 or 903 and 908 which are provided for luminance data and color difference data, respectively and separately. The band characteristic of the band limitation filter performed with respect to each signal is set to the reduction ratio×fs for luminance data and the reduction ratio×fs/2 for color difference data. A two-dimensional characteristic of the band limitation filter is caused to be similar to the reproduction bands of the original luminance data and color difference data.

Figure 10:
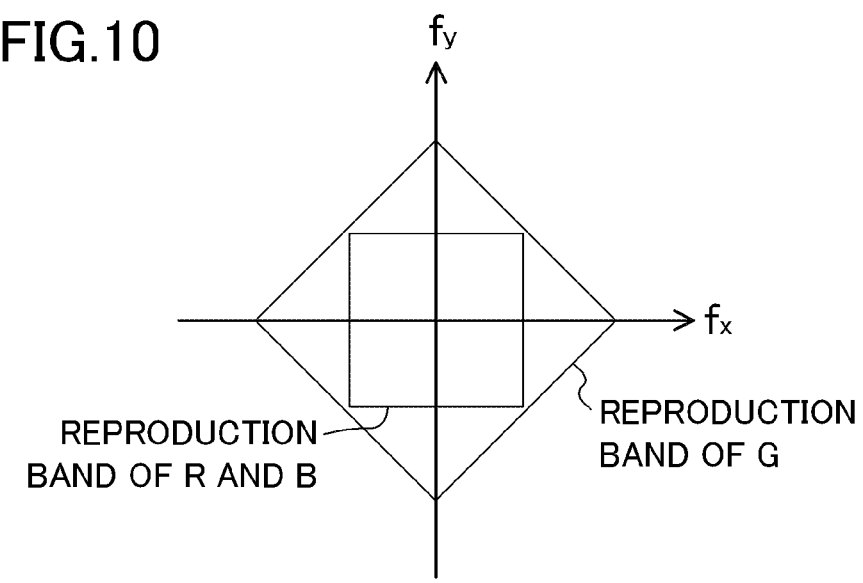
FIG. 10 is a diagram showing a two-dimensional reproduction band of each color in the Bayer array of the color filter.

FIG. 10 shows a two-dimensional reproduction band of each color in the Bayer array. In FIG. 10, for the Bayer array, the reproduction band of each color based on the sampling theorem is indicated in a spatial frequency coordinate system (absolute (non-normalized) spatial frequency coordinate system). The two-dimensional reproduction band of the R and B signal is in the shape of a rectangle, and the two-dimensional reproduction band of the G signal is in the shape of a diamond.

Note that, as can be seen from FIG. 10, the reproduction band of the R and B signals in the Bayer array and the reproduction band of the G signal are aligned if one is rotated by 45 degrees with respect to the other. The difference in size is caused by the difference in the number of sampling points between the R and B signals and the G signal.

By employing the band limitation filter processes 603 and 609 or 903 and 908 described above, the occurrence of a false color after image reproduction can be minimized without sacrificing the sampling frequency of each color.

Figure 11A:
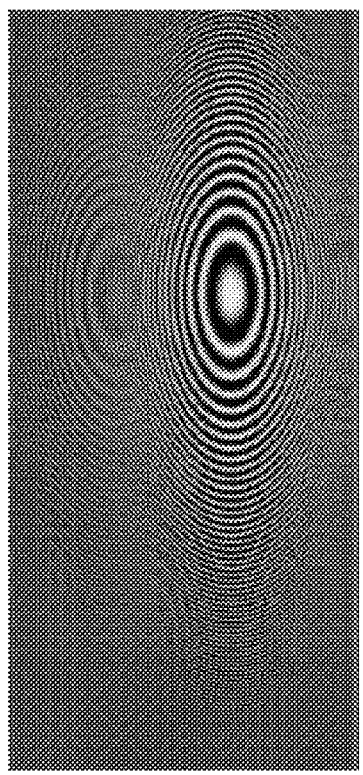
FIG. 11A is a diagram showing a reduced RAW image obtained when a circular zone plate (CZP) image is separated into R, G, and B color data before a halving (resizing) process is performed in the horizontal direction.
Figure 11B:
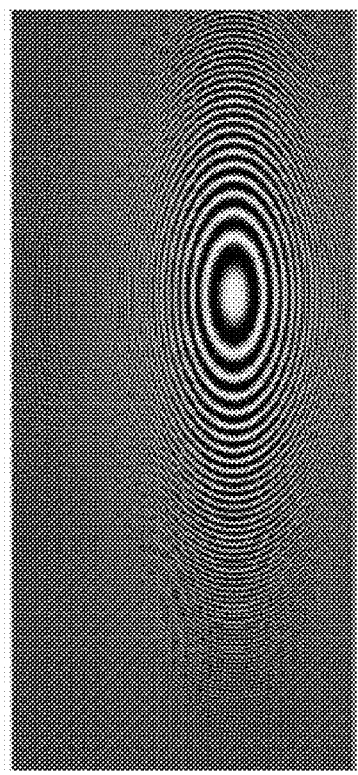
FIG. 11B is a diagram showing a reduced RAW image obtained when the CZP image is subjected to a two-line reduction (resizing) process for luminance data and color difference data according to the present disclosure.

FIGS. 11A and 11B show reduced RAW data obtained when a halving (resizing) process is performed in the horizontal direction with respect to a circular zone plate (CZP) image which is an actual CCDRAW image having a Bayer pattern. The processed image of FIG. 11A is obtained by performing reduction (resizing) after the RGB data of the Bayer pattern spatially arranged in a CCDRAW image is separated into three colors (R, G, and B). The processed image of FIG. 11B is obtained by performing the two-line reduction (resizing) process of the present disclosure with respect to luminance data and color difference data.

By comparing FIGS. 11A and 11B, it can be seen that, in the embodiment of the present disclosure, a reduced RAW image having the same reproduction band characteristic as that of a large-size CCDRAW image can be generated from the CCDRAW image, and the occurrence of a false color in a final image can be reduced or prevented, and the maximum feel of resolution of a luminance signal can be maintained.

Next, correction of distortion of an image using the CCDRAW image resizing process of the present disclosure will be described.

Figure 12A:
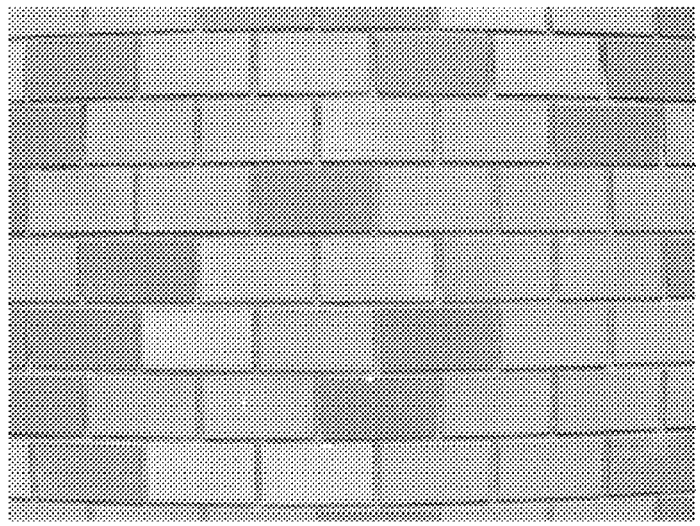
FIG. 12A is a diagram showing an input image having barrel distortion caused by a wide-angle lens.
Figure 12B:
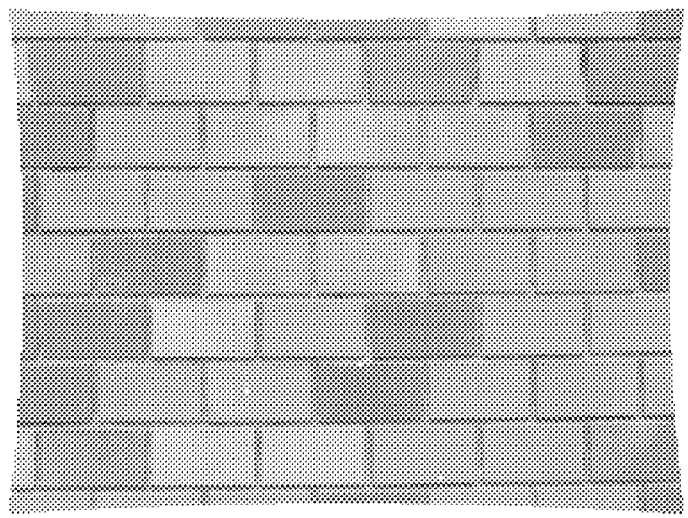
FIG. 12B is a diagram showing a result of correction by performing a line-by-line resizing process with respect to the input image in the horizontal direction and the vertical direction.

FIG. 12A is a diagram showing barrel distortion of a CCDRAW image caused by using a wide-angle lens. FIG. 12B is a diagram showing the result of the line-by-line resizing process performed in the horizontal and vertical directions with respect to the CCDRAW image.

When the line-by-line resizing process is performed with respect to a digital image signal of a captured original image with barrel distortion, the distortion can be corrected by changing the resizing ratio on a line-by-line basis. As in the foregoing embodiment, the line-by-line process includes a filter process step of extracting luminance data and color carrier data from an original image by a line-by-line filter process, a noise removal step of performing noise removal with respect to the color carrier data, a color difference data demodulation step of converting the noise-removed color carrier data into color difference data, a band limitation filter process step of performing band limitation filter processes having different characteristics to the extracted luminance data and the color difference data, respectively, a continuously variable arbitrary ratio resizing process step of continuously changing the resizing ratio with respect to the luminance data and the color difference data on a line-by-line basis, depending on the line position, a color carrier modulation step of converting the resized color difference data back into color carrier data on a line-by-line basis, and a color array reproduction process step of recombining the resized luminance data and the modulated color carrier data on a line-by-line basis to generate a plurality of pieces of final color array data.

During the process, it is necessary to continuously change the resizing ratio, depending on the line position. The resizing ratio depends on a characteristic of the optical lens 101. Therefore, the characteristic data of the optical lens 101 is previously stored in the ROM 115 of FIG. 1, and correction data is set to the RAW data horizontal resizing process 302 and the RAW data vertical resizing process 304 of FIG. 3 using the CPU 114, depending on the number of pixels in the imaging element 104, and the two-step resizing process (302 and 304) is performed.

There is a phenomenon called "chromatic difference of magnification" caused by a characteristic of the optical lens 101. It is assumed that the resizing process is performed with respect to a CCDRAW image. In this case, in the continuously variable arbitrary ratio resizing process step in which color difference data extracted from each line in the image process is resized while continuously changing the resizing ratio, depending on the line position, the arbitrary ratio of the color difference data to luminance data is set to a value for correcting an offset between the color difference data and the luminance data caused by chromatic aberration, and line data is read out so that the center position of the resized luminance line data coincides with that of the color difference line data having a different size after the resizing process, whereby the correction can be achieved.

Figure 13:
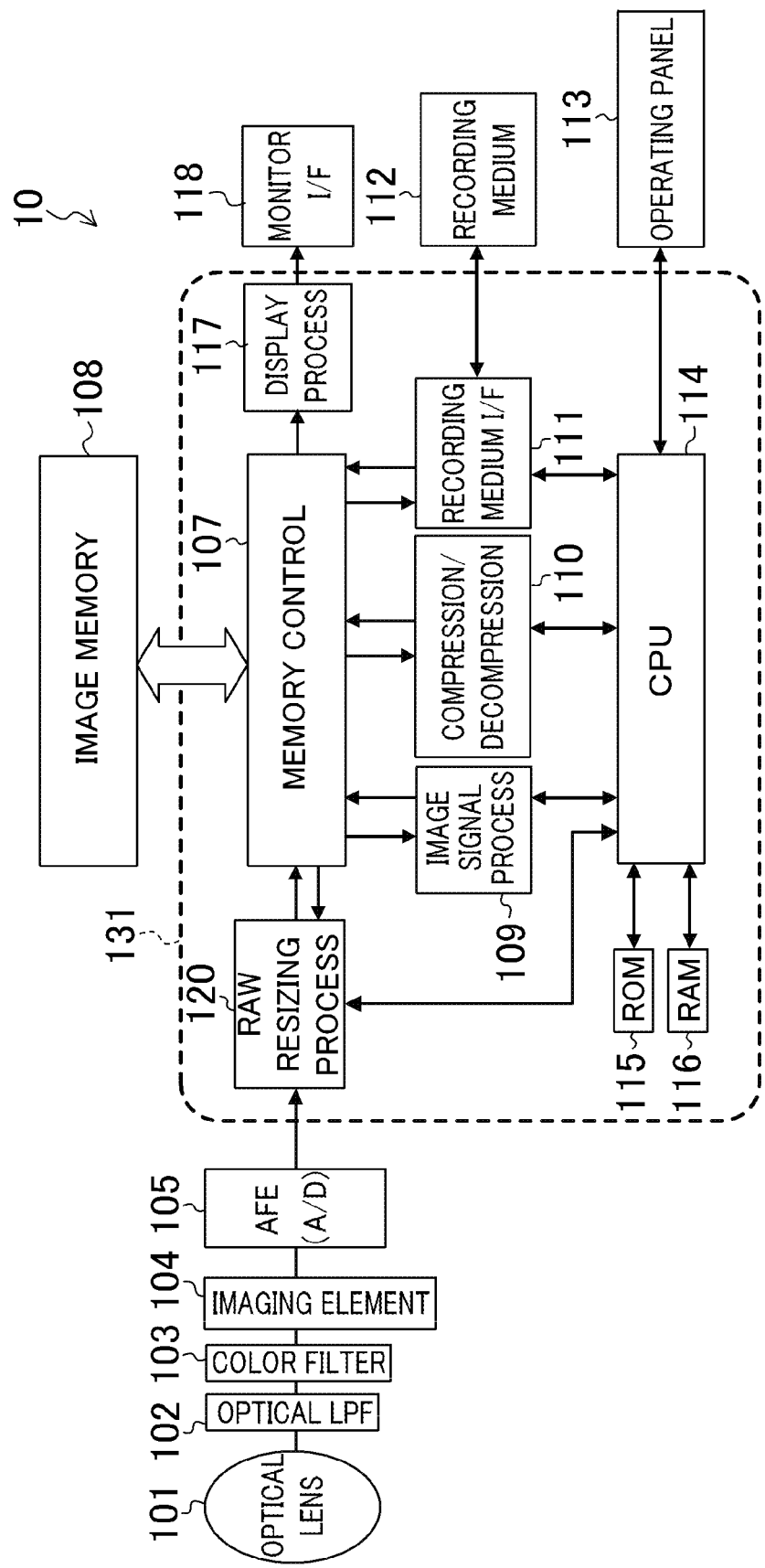
FIG. 13 is a block diagram showing a semiconductor integrated circuit in which a resizing process function according to the present disclosure is implemented as a digital circuit at an input portion of a digital signal process LSI.
Figure 14:
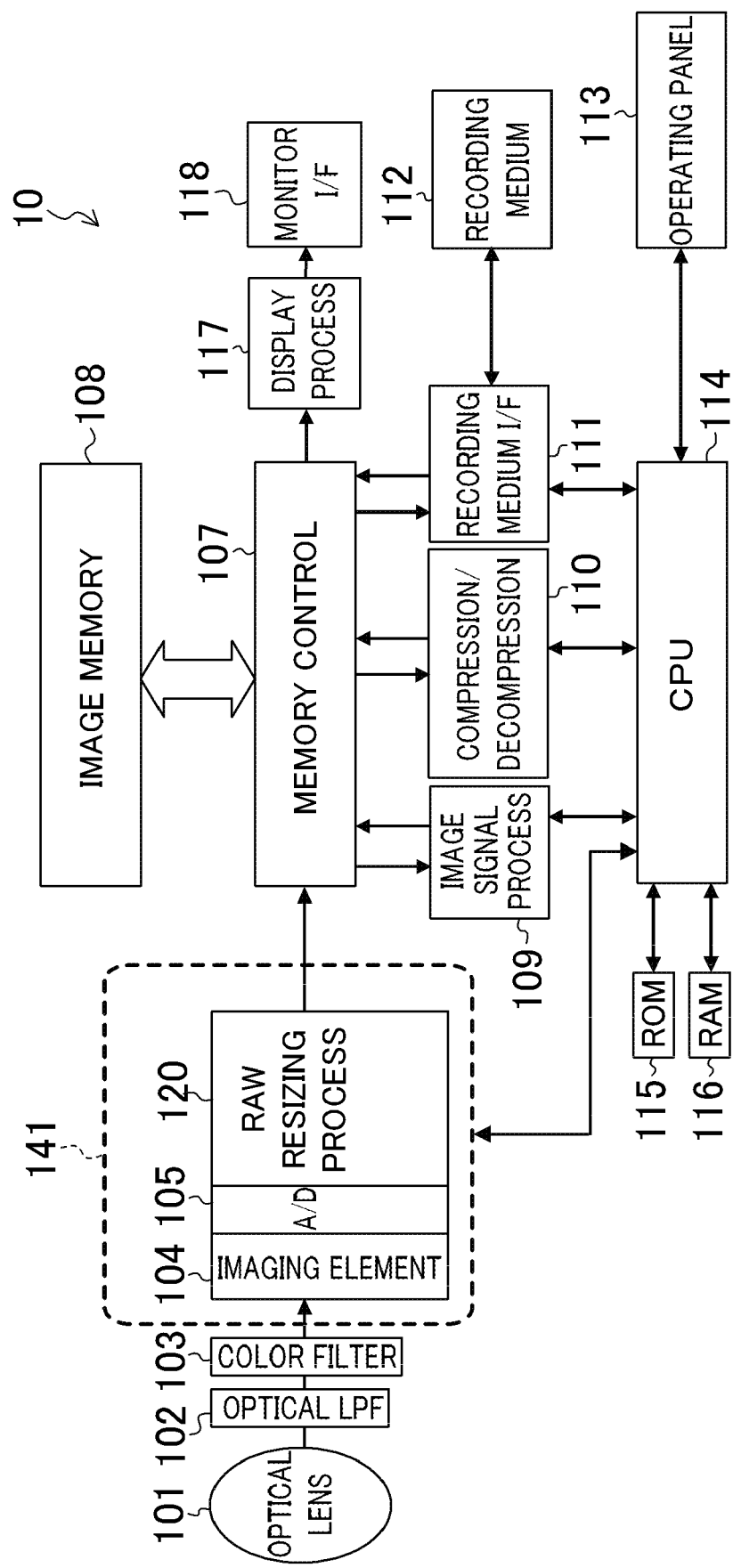
FIG. 14 is a block diagram showing a semiconductor integrated circuit in which the resizing process function of the present disclosure is implemented as a digital circuit at an output portion of a MOS image sensor.
Figure 15:
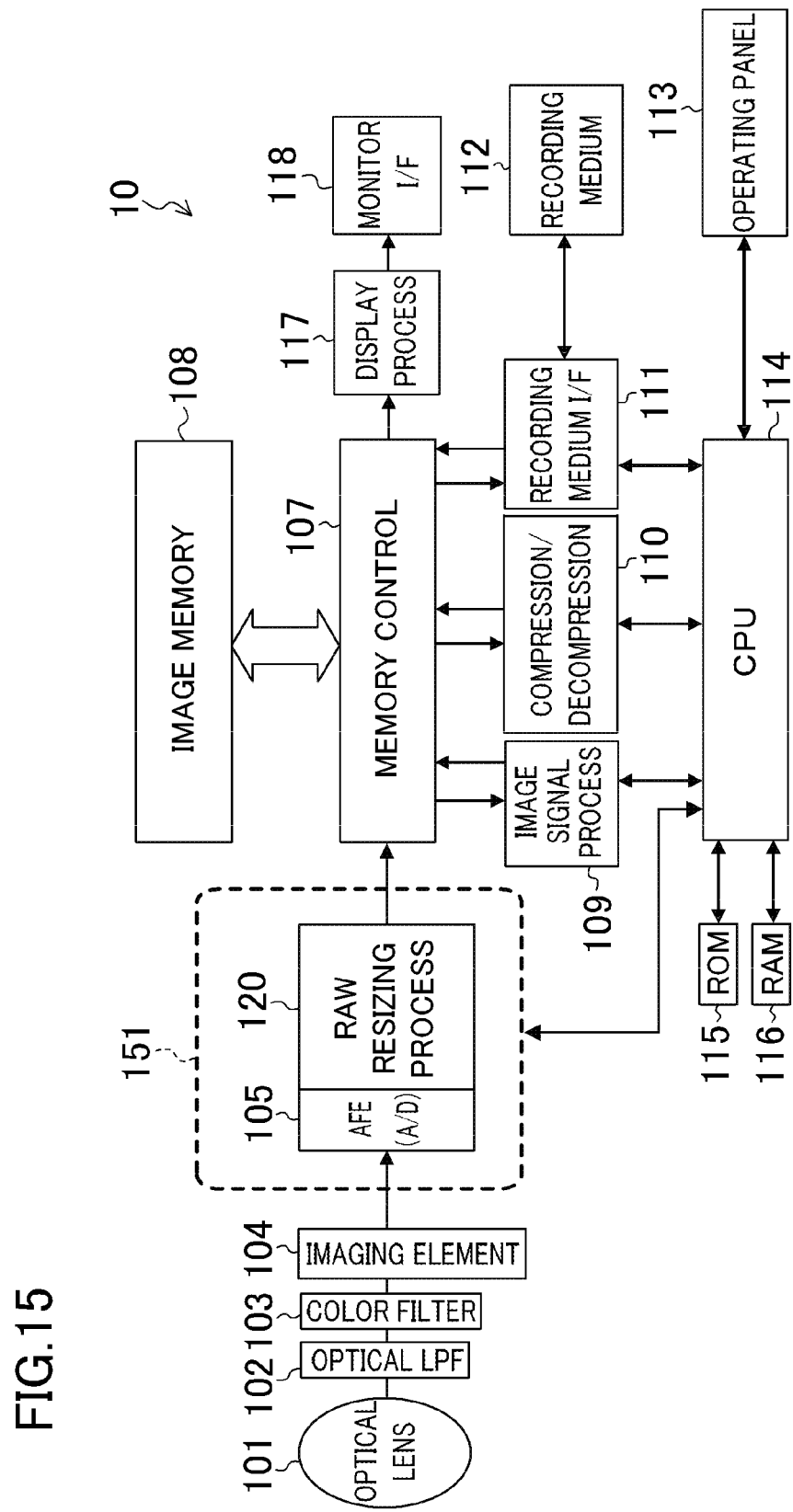
FIG. 15 is a block diagram showing a semiconductor integrated circuit in which the resizing process function of the present disclosure is implemented as a digital circuit at an output portion of an analog front end LSI which converts an analog output of a MOS image sensor into a digital signal.

Note that when a dedicated image processing device is provided as means for carrying out the present disclosure, the dedicated image processing device can be mounted and implemented inside a semiconductor integrated circuit. In this case, there are three representative implementations, and combinations thereof. FIGS. 13, 14, and 15 schematically show the implementations.

In FIG. 13, a reference character 131 indicates a semiconductor integrated circuit which is a digital signal processing LSI including, at an input portion thereof, a digital circuit (RAW resizing processor 120) having an architecture based on the image processing method of the present disclosure.

In FIG. 14, a reference character 141 indicates a semiconductor integrated circuit which is a MOS image sensor including, at an output portion thereof, a digital circuit (RAW resizing processor 120) having an architecture based on the image processing method of the present disclosure. An imaging element 104, such as a CMOS imaging element, etc., includes a noise processor and an A/D converter as means for achieving high-speed read operation, to directly output a digital signal.

In FIG. 15, a reference character 151 indicates a semiconductor integrated circuit which is an analog front end LSI including, at an output portion thereof, a digital circuit (RAW resizing processor 120) having an architecture based on the image processing method of the present disclosure. The analog front end LSI 151 includes an A/D converter so that the analog front end LSI 151 can output digital data.

Means for carrying out the present disclosure is not limited to a dedicated image processing device (an image reproduction device, an image processing device, and a semiconductor integrated circuit), and may be a personal computer. The whole or a part of the image process may be implemented not only by hardware (signal processing circuit), but also by software.

The image processing program of the present disclosure may be configured as a separate application software program, or may be incorporated as a part of an application, such as an image processing software program, a file management software program, etc. The image processing program of the present disclosure is not limited to application to a computer system, such as a personal computer, etc., or may be used as an operating program for a central processing unit (CPU) incorporated into an information device, such as a digital camera, a mobile telephone, etc.

As described above, the imaging device, the image processing method, the image processing program, and the semiconductor integrated circuit of the present disclosure, when resizing an original image, can maintain the feel of resolution while reducing a false luminance signal and a false color, and therefore, are useful for an image data size changing device, an electronic still camera, an image data size changing program, a semiconductor integrated circuit, etc. which are suited to an reduction process, an enlargement process, or distortion correction with respect to an original image obtained from a single-sensor color imaging element.

What is claimed is:

1. An imaging device for handling a digital image signal of an original image having pixels with a plurality of colors arranged in a color array with a periodicity, comprising:
   a filter processor configured to extract luminance data and color carrier data from the original image by a line-by-line filter process;
   a color difference data demodulator configured to convert the color carrier data into color difference data;
   a band limitation filter processor configured to perform band limitation filter processes having different characteristics with respect to the extracted luminance data and the color difference data, respectively;
   a resizing processor configured to reduce or enlarge the luminance data and the color difference data separately;
   a color carrier modulator configured to convert the resized color difference data back into color carrier data; and
   a color array reproduction processor configured to recombine the resized luminance data and the modulated color carrier data to generate a plurality of pieces of final color array data.

2. The imaging device of claim 1, wherein
   the imaging device further has a function of performing the resizing process again with respect to a plurality of pieces of color array data which have been resized in one direction by performing a one-dimensional line-by-line process with respect to the original image, to generate a plurality of pieces of color array data which are two-dimensionally resized.

3. The imaging device of claim 1, wherein
   the imaging device further has a function of temporarily writing, to a storage device, a plurality of pieces of color array data which have been resized in one direction by performing a one-dimensional line-by-line process with respect to the original image, and reading from the storage device and performing the resizing process again with respect to the plurality of pieces of resized color array data on a line-by-line basis in a direction perpendicular to the line direction in which the writing has been performed, to generate a plurality of pieces of color array data which are two-dimensionally resized.

4. The imaging device of claim 1, wherein
   the imaging device further has a function of writing a plurality of pieces of color array data which have been resized in one direction by performing a one-dimensional line-by-line process with respect to the original image, to a line memory including a plurality of lines on a line-by-line basis while reading out a plurality of lines of data from the line memory, extracting luminance data and color carrier data from a group of data of interest in a vertical direction occurring at the same position in a horizontal direction of the read plurality of lines of data, performing the process again with respect to the luminance data and the color carrier data, and performing a process of increasing or decreasing the number of output lines with respect to the number of input lines, to generate a plurality of pieces of color array data which are two-dimensionally resized.

5. The imaging device of claim 1, wherein
   the resizing processor has a function of resizing the luminance data and the color difference data on a line-by-line basis while continuously changing a resizing ratio, depending on a line position.

6. The imaging device of claim 5, wherein
   the resizing processor has a function of setting an arbitrary ratio of the color difference data to the luminance data to a different value, and adjusting an output read from the line data so that a center position of the resized luminance line data coincides with that of the color difference line data having a size different from that of the resized luminance line data.

7. The imaging device of claim 1, wherein
   the original image is obtained by using a single-sensor color imaging element having pixels with a plurality of colors provided by primary color filters or complementary color filters and arranged in a color array with a periodicity.

8. The imaging device of claim 1, wherein
   the original image is obtained by using a single-sensor color imaging element having pixels provided by primary color filters or complementary color filters and arranged in lines, the pixels including pixels with a plurality of colors arranged in some of the lines with a periodicity in each line and pixels with a single color arranged in the other lines without a periodicity in each line.

9. An image processing method for handling a digital image signal of an original image having pixels with a plurality of colors arranged in a color array with a periodicity, comprising:
   a filter process step of extracting luminance data and color carrier data from the original image by a line-by-line filter process;
   a noise removal step of removing noise from the color carrier data;
   a color difference data demodulation step of converting the noise-removed color carrier data into color difference data;
   a band limitation filter process step of performing band limitation filter processes having different characteristics with respect to the extracted luminance data and the color difference data, respectively;
   a resizing process step of reducing or enlarging the luminance data and the color difference data separately;
   a color carrier modulation step of converting the resized color difference data back into color carrier data; and
   a color array reproduction step of recombining the resized luminance data and the modulated color carrier data to generate a plurality of pieces of final color array data.

10. The image processing method of claim 9, further comprising:
    a step of performing the resizing process again with respect to a plurality of pieces of color array data which have been resized in one direction by performing a one-dimensional line-by-line process with respect to the original image, to generate a plurality of pieces of color array data which are two-dimensionally resized.

11. The image processing method of claim 9, further comprising:
    a step of temporarily writing, to a storage device, a plurality of pieces of color array data which have been resized in one direction by performing a one-dimensional line-by-line process with respect to the original image, and reading from the storage device and performing the resizing process again with respect to the plurality of pieces of resized color array data on a line-by-line basis in a direction perpendicular to the line direction in which the writing has been performed, to generate a plurality of pieces of color array data which are two-dimensionally resized.

12. The image processing method of claim 9, further comprising:
    a step of writing a plurality of pieces of color array data which have been resized in one direction by performing a one-dimensional line-by-line process with respect to the original image, to a line memory including a plurality of lines on a line-by-line basis while reading out a plurality of lines of data from the line memory, extracting luminance data and color carrier data from a group of data of interest in a vertical direction occurring at the same position in a horizontal direction of the read plurality of lines of data, performing the process again with respect to the luminance data and the color carrier data, and performing a process of increasing or decreasing the number of output lines with respect to the number of input lines, to generate a plurality of pieces of color array data which are two-dimensionally resized.

13. The image processing method of claim 9, wherein the resizing process step includes a step of resizing the luminance data and the color difference data on a line-by-line basis while continuously changing a resizing ratio, depending on a line position.

14. The image processing method of claim 13, wherein the resizing process step includes a step of setting an arbitrary ratio of the color difference data to the luminance data to a different value, and adjusting an output read from the line data so that a center position of the resized luminance line data coincides with that of the color difference line data having a size different from that of the resized luminance line data.

15. The image processing method of claim 9, wherein the original image is obtained by using a single-sensor color imaging element having pixels with a plurality of colors arranged with a periodicity and provided by primary color filters or complementary color filters.

16. The image processing method of claim 9, wherein the original image is obtained by using a single-sensor color imaging element having pixels provided by primary color filters or complementary color filters and arranged in lines, the pixels including pixels with a plurality of colors arranged in some of the lines with a periodicity in each line and pixels with a single color arranged in the other lines without a periodicity in each line.

17. A non-transitory recording medium storing an image processing program for handling a digital image signal of an original image having pixels with a plurality of colors arranged in color array with a periodicity, the program allowing a computer to execute:
  a filter process function of extracting luminance data and color carrier data from the original image by a line-by-line filter process;
  a noise removal function of removing noise from the color carrier data; a color difference data demodulation function of converting the noise-removed color carrier data into color difference data;
  a band limitation filter process function of performing band limitation filter processes having different characteristics with respect to the extracted luminance data and the color difference data, respectively;
  a resizing process function of reducing or enlarging the luminance data and the color difference data separately;
  a color carrier modulation function of converting the resized color difference data back into color carrier data; and
  a color array reproduction function of recombining the resized luminance data and the modulated color carrier data to generate a plurality of pieces of final color array data.

18. A digital signal process LSI comprising:
  a digital circuit having an architecture based on the image processing method of claim 9,
wherein
  the digital circuit is provided at an input portion of the digital signal process LSI.

19. A MOS image sensor comprising:
  an A/D converter configured to output digital data; and
  a digital circuit having an architecture based on the image processing method of claim 9,
wherein
  the digital circuit is provided at an output portion of the MOS image sensor.

20. An analog front end LSI comprising:
  an A/D converter configured to output digital data; and
  a digital circuit having an architecture based on the image processing method of claim 9,
wherein
  the digital circuit is provided at an output portion of the analog front end LSI.

* * * * *